United States Patent
Sproule, III

(10) Patent No.: US 6,382,260 B1
(45) Date of Patent: May 7, 2002

(54) WATER RESISTANT ADJUSTABLE JACKETS FOR INSULATED PIPE BENDS

(76) Inventor: Charles G. Sproule, III, P.O. Box 15, Devault, PA (US) 19432

( * ) Notice: Subject to any disclaimer, the term of this patent is extended or adjusted under 35 U.S.C. 154(b) by 0 days.

(21) Appl. No.: 09/954,881

(22) Filed: Sep. 18, 2001

Related U.S. Application Data

(63) Continuation-in-part of application No. 09/519,292, filed on Mar. 6, 2000, now Pat. No. 6,315,005.

(51) Int. Cl.⁷ .................................................. F16L 9/14
(52) U.S. Cl. ........................ 138/149; 138/151; 138/158; 138/161; 138/162; 138/166; 138/167; 138/169
(58) Field of Search ................................ 138/149, 151, 138/158, 161, 162, 166, 167, 169

(56) References Cited

U.S. PATENT DOCUMENTS

| | | | |
|---|---|---|---|
| 2,122,380 A | * | 6/1938 | Ragsdale et al. ............ 138/158 |
| 2,981,072 A | | 4/1961 | Brewington |
| 3,055,399 A | * | 9/1962 | Bush et al.. ................. 138/167 |
| 3,102,740 A | | 9/1963 | Plumer |
| 3,153,546 A | | 10/1964 | Dunn |
| 3,623,513 A | | 11/1971 | Dinkelkamp |
| 3,757,031 A | | 9/1973 | Izraeli |
| 4,054,985 A | | 10/1977 | Aleniusson |
| 4,164,243 A | * | 8/1979 | Cookson et al. ............. 138/162 |
| 4,348,794 A | | 9/1982 | Kim et al. |
| 4,647,713 A | * | 3/1987 | De Nijs et al. .............. 138/166 |
| 5,020,481 A | | 6/1991 | Nelson et al. |
| 5,022,685 A | * | 6/1991 | Stiskin et al. ................ 138/166 |
| 5,727,599 A | | 3/1998 | Fisher et al. |
| 5,775,379 A | | 7/1998 | Manofsky |
| 5,905,231 A | * | 5/1999 | Houte et al. ................. 138/166 |
| 6,315,005 B1 | * | 11/2000 | Sproule, III ................. 138/149 |
| 6,182,706 B1 | * | 2/2001 | Tako et al. .................. 138/168 |

* cited by examiner

*Primary Examiner*—James Hook
(74) *Attorney, Agent, or Firm*—Imre Balogh

(57) ABSTRACT

An adjustable jacket and method of covering an insulated conduit, the jacket having two parts which together form a cylindrical configuration over the insulated conduit. Overlapping flanges of the two parts equipped with grooves and ridges allow tightening of the two parts so that the jacket conforms to the underlying conduit having bends and curves.

39 Claims, 12 Drawing Sheets

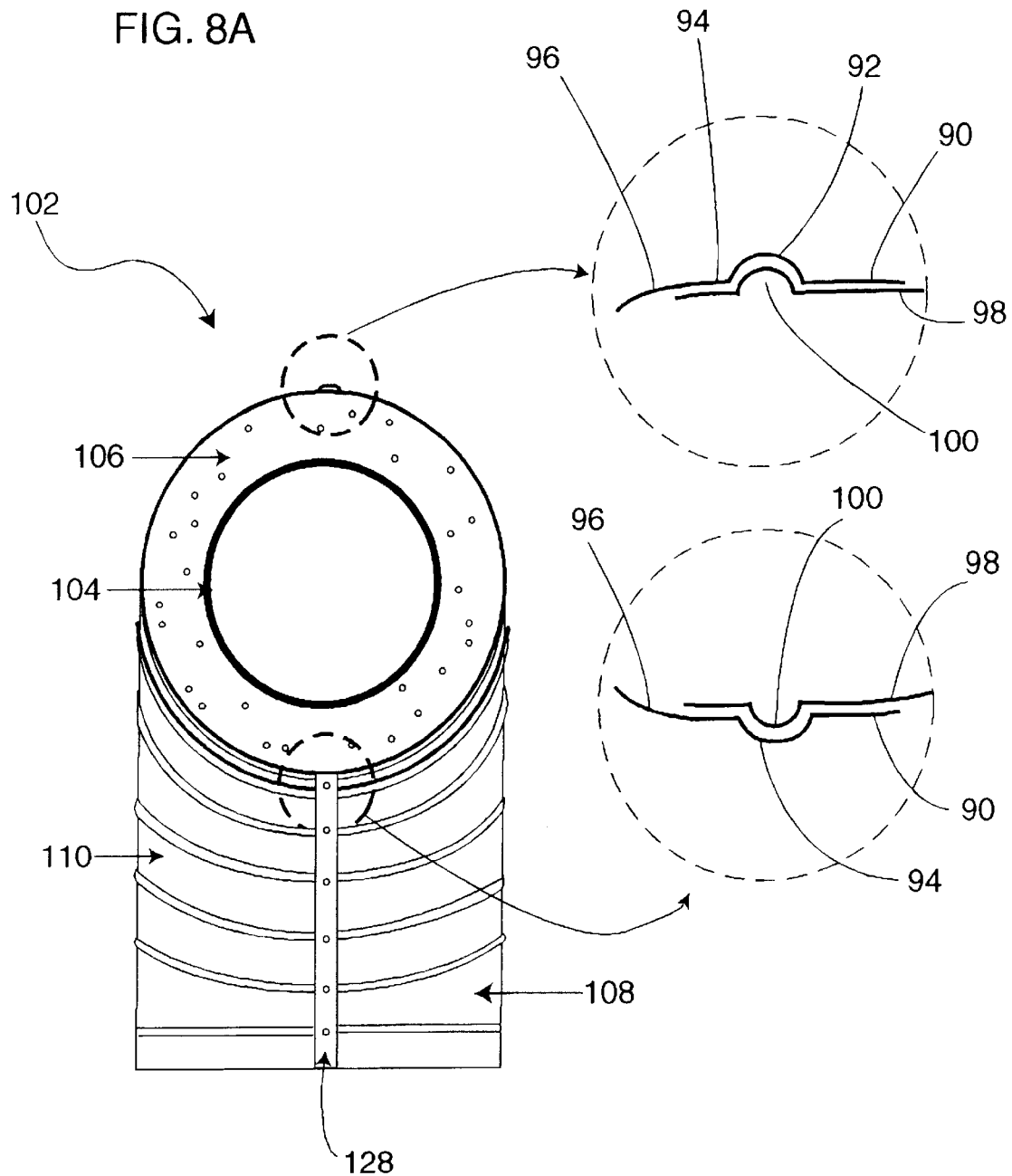

WATER RESISTANT ADJUSTABLE JACKETS FOR INSULATED PIPE BENDS

This application is a continuation-in-part of application Ser. No. 09/519,292 filed on Mar. 6, 2000 now U.S. Pat. No. 6,315,005.

BACKGROUND OF THE INVENTION

1. Field of the Invention

This invention relates to adjustable jackets for use over insulated fluid transporting pipes or tubes. More particularly, the invention relates to adjustable metal jackets and methods for covering insulated pipes therewith having fittings with various angles other than a right angle to prevent damage to the insulation from the environment.

2. Reported Developments

Industrial conduits, such as used in the chemical, petrochemical, power, pulp and refinery fields require insulation for temperature-controlled processes, energy conservation and safety. The insulation helps maintain a desired temperature of the medium carried by the conduits which is different from the temperature of the environment. Most of the industrial conduits are located outdoors and must be protected from water. The penetration of water and moisture from the air into an insulation system can cause loss of insulating performance and corrosion of the conduits. The loss of insulation property can also affect the contents of the conduit, such that a vapor component of the conduit's contents may become condensed, i.e. the liquid may freeze and disrupt the fluid flow within the conduit or rupture the conduit. The partially frozen liquid may also be transferred through the conduit into processing equipment, thereby adversely affecting the operation of the equipment.

Typically, industrial pipe insulation is protected by jackets made of metal, such as aluminum and stainless steel, or flexible and semi-rigid materials, such as thermoplastics. It is relatively easy to install weather-tight jackets to straight run insulation by putting the overlap of the jackets in a watershed position in order to direct water away from the area of the overlap. Installing jackets, especially metal jackets, on fittings having elbows of 90°, 45° and Tees in a weather-tight fashion has been problematic. Conforming the shape of the jackets to elbow fittings covered with insulation is rendered rather difficult because of the various pipe diameters and the various outside diameters of the insulation covering the pipes. In practice it is economically disadvantageous to produce pre-shaped jackets for covering various pipe sizes covered by various thickness of insulations.

The prior art has provided, for pipe elbow insulations, a jacket comprising overlapping connecting flanges formed with inter-engageable ribs and grooves. The jacket is assembled around a fibrous insulation which is wrapped around a pipe elbow and angularly related pipes connected to the elbow. The grooves serve as interval moisture traps for condensation.

The prior art has also provided a method for the application of a protective cover around heat or cool insulated tube bends. In the method, a corrugated bend-form material is spirally wound into a tube and the adjoining tube edges are secured, such as by lapping, to form a non-slip joint. The corrugated tube is cut lengthwise into two or more parts which are then placed over the insulated pipe bend. The cut edges are re-joined to form the protective cover.

Still another approach of the prior art includes the provision of a jacket having a plurality of pleats that provide points of flexure so that the jacket can be conformed to the bends and curves in the underlying insulation.

Illustrative prior art approaches for providing protection jackets are disclosed, for example, in U.S. Pat. Nos. 3,153,546; 4,054,985; and 5,775,379. While these and other approaches and proposals of the prior art greatly improved the insulation systems around pipes and tubes, there exits a need to further improve such insulation systems. Accordingly, an object of the present invention is to provide an adjustable jacket which would enclose the insulation material over the bends and joints of pipes and tubes so that the jacket can be tightened and tensioned over insulations having various diameters.

Another object of the present invention is the provision of easily installable jackets which, by their orientation on pipes and tubes, will prevent entry of water and moisture into the underlying insulation.

A further object of the present invention is the provision of jackets which can be pre-fabricated and which can be installed at the site of application without cutting or other cumbersome steps.

A still further object of the invention is the protection from corrosion of the pipes and tubes transporting fluids thereby maintaining the integrity of such fluids.

SUMMARY OF THE INVENTION

The present invention provides adjustable jackets for insulated conduits which carry fluids therein. The invention consists of eight embodiments.

In the first embodiment, the invention provides: a first section of semi-circular, cross-sectional configuration having flanges equipped with grooves; a second section of semi-circular cross-sectional configuration having flanges equipped with ridges. The flanges are incrementally adjustable over the insulated conduit by snap-fitting the ridges into the grooves.

In the second embodiment the invention provides for incremental adjustment of the first section to the second section on two opposite sides of the jacket.

In the third embodiment there are provided two adjustments of the first and second sections on opposite sides of the jacket. One adjustment is incremental, and the other adjustment on the opposite side of the jacket is slideable. The incremental adjustment is made first, followed by the slideable adjustment so that the jacket tightly conforms to the configuration of the underlying insulated conduit.

In the fourth embodiment there are provided two identical slideable adjustments on the opposite sides of the jacket. The slideable adjustments run from a fixed point in the top layer to any point in the top layer until the desired tightness is achieved.

In the fifth embodiment there are provided two identical slideable adjustments on the opposite sides of the jacket.

In the sixth embodiment there are provided combination adjustments using the first-to-fifth embodiments.

In the seventh embodiment there is provided one semi-circular ridge in the bottom layer, and a rounded elevational portion in the top layer, the combination of which allows tightening of the layers beginning from the rounded elevational portion towards the other end of the layer as desired during the installation process.

More particularly, the jacket comprises:
 a longitudinal first section having end portions and side portions and being of a generally semi-circular cross-sectional configuration;

a longitudinal second section having end portions and side portions and being of a generally semi-circular cross-sectional configuration,
    wherein said longitudinal first section and said longitudinal second section form a generally cylindrical configuration over an insulated conduit;
a longitudinal flange projecting from each of said side portions of said first section;
a longitudinal flange projecting from each of said side portions of said second section;
each of said longitudinal flanges having a top layer and a bottom layer, said top layer of said longitudinal flanges projecting from each of said side portions of said first section and said second section comprises a groove having an open side and a closed side defined by:
    a first flat portion;
    a rounded elevational portion constituting one side of said groove extending above the first flat portion and being contiguous therewith;
    an extended flat middle portion constituting a top of said groove running form said rounded elevational portion and being parallel to said first flat portion; and
    a slightly declining second flat portion extending from said middle portion and constituting the open side of said groove;
said bottom layer of said longitudinal flanges projecting from each of said side portions of said first section and said second section comprises a longitudinal ridge extending towards said flat middle portion of said groove in the top layer for slideable engagement therewith whereby said first section and said second section of the jacket allows tightening of the jacket over an insulated conduit.

In the eighth embodiment unlimited tightening of the top and bottom layers is made possible by the provision of a bottom layer having a semi-circular ridge therein and a half channel in the top layer which bends toward the bottom layer. The half channel during tightening may be positioned adjacent to the semi-circular ridge on either side thereof, or it may be positioned away from the semi-circular ridge at one side of the ridge as required to tighten the jacket fitting. The semi-circular ridge directs water away from the jacket fitting while the half-channel prevents water from penetrating into the jacket fitting.

More particularly, the jacket comprises:
    a longitudinal first section having end portions and side portions and being of a generally semi-circular cross-sectional configuration;
    a longitudinal second section having end portions and side portions and being of a generally semi-circular cross-sectional configuration,
        wherein said longitudinal first section and said longitudinal second section form a generally cylindrical configuration over an insulated conduit;
    a longitudinal flange projecting from each of said side portions of said first section;
    a longitudinal flange projecting from each of said side portions of said second section;
    each of said longitudinal flanges having a top layer and a bottom layer,
    said top layer of said longitudinal flanges projecting from each of said side portions of said first section and said second section comprises a half channel bending towards and conforming to said bottom layer;
    said bottom layer of said longitudinal flanges projecting form each of said side portions of said first section and said second section comprises:
        a small flat portion at one end of the layer;
        a semi-circular ridge adjacent to the small flat portion; and
        a large flat portion extending away from the semi-circular ridge; wherein
    said top layer and said bottom layer form a slideable engagement with each other thereby allowing tightening of the jacket over an insulated conduit.

The embodiments of the invention include adjustable jackets for straight and bend configurations of conduits.

BRIEF DESCRIPTION OF THE DRAWINGS

FIG. 8A shows in side-elevational view the jacket overlap design wherein two half jacket fittings shown in FIG. 8 are joined together over an insulated pipe joint;

DESCRIPTION OF THE PREFERRED EMBODIMENTS

In one aspect the present invention provides jackets having novel closure systems which surround insulated conduits, such as pipes and tubes. Such conduits are used extensively in industrial piping systems such as in various refineries, petrochemical, power, and pulp and paper plants. The conduits require insulation for process control, energy conservation and safety. In another aspect the present invention provides methods of installing jackets over conduits covered by insulations.

The majority of industrial conduits are located outdoors or in washdown areas and, therefore, the insulation must be protected from water and weather penetrations. The penetration of water or moisture into the insulation can cause problems such as process disruption due to the loss of insulating performance caused by the wet insulation and the accelerated corrosion of the metal conduits.

The type of insulation used on metal conduits include but are not limited to: rigid insulations, such as made of calcium silicate, perlite silicate, cellular glass, Styrofoam and polyisocyanourate/urethane; semi-rigid insulations, such as made of high density mineral wool; and soft insulations, such as made of soft fiberglass and soft elastomeric materials including elastomeric foams.

One of the most commonly used materials used to make jackets of industrial conduit is metal, such as aluminum and steel, since the metal is rugged and durable. It is relatively easy to apply a weather-tight metal jacket to straight run insulation that is horizontal by putting the jacket in a watershed position as shown in FIGS. 1 and 2.

Figure 1:
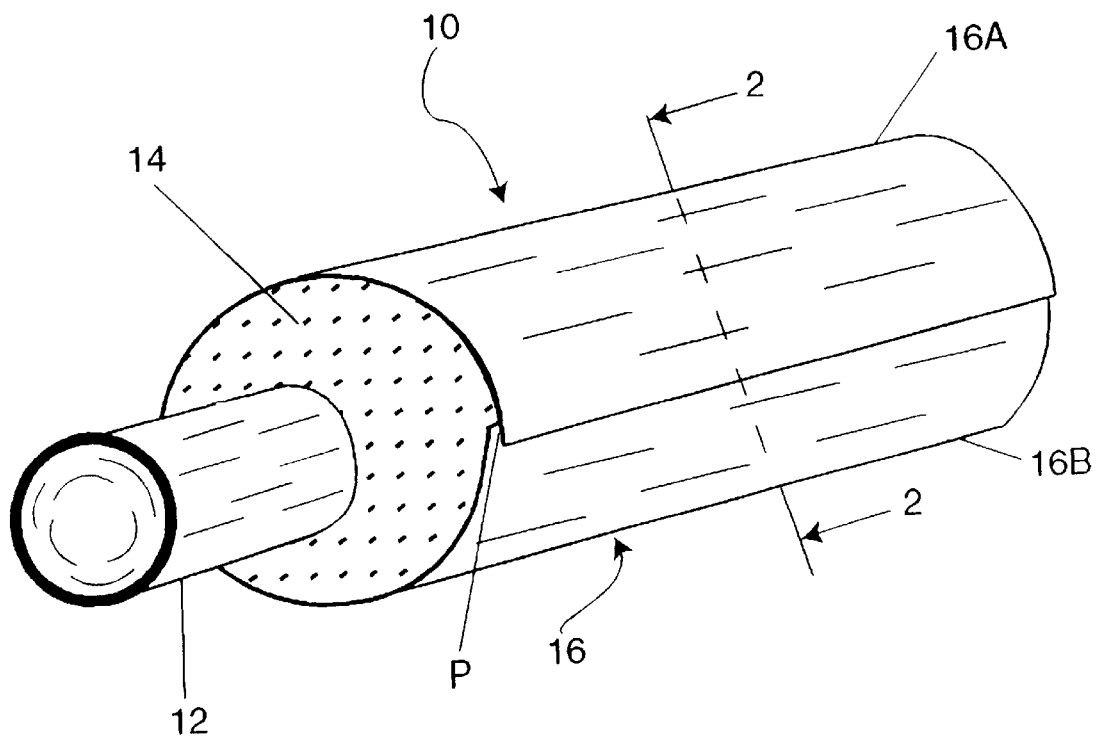
FIG. 1 is a fragmentary perspective view of a horizontal straight run conduit covered by an insulation and a jacket.

In FIG. 1 there is shown in a fragmentary prospective view a horizontal straight run conduit covered by an insulation and a jacket, wherein: the numeral 10 generally denotes the assembly of the meal pipe 12, numeral 14 denotes the insulation and 16 generally denotes the metal jacket covering the insulation. Jacket 16 comprises two parts 16A and 16B wherein 16A overlaps 16B at area P. The overlap P is located at about 3 o'clock to shed water running down from portion 16A and is about 0.5 to about 1.0 inch on each side.

Figure 2:
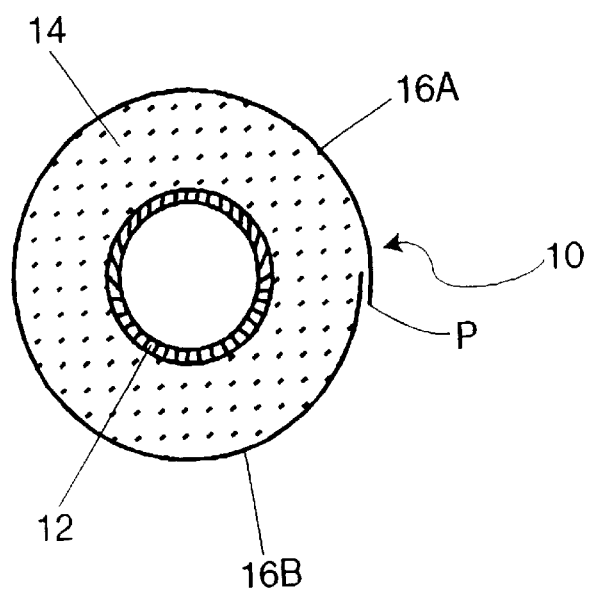
FIG. 2 is a cross-sectional view of the horizontal straight run conduit covered by an insulation and a jacket, taken along the line 2—2 of FIG. 1.

FIG. 2 is a cross-sectional view of the horizontal straight run conduit covered by an insulation and a jacket, taken along the line 2—2 of FIG. 1.

The fittings of sections of conduits shown in FIGS. 1 and 2 is accomplished by simply inserting one section of a conduit into a similar conduit section of another conduit in a male/female relationship.

Figure 3:
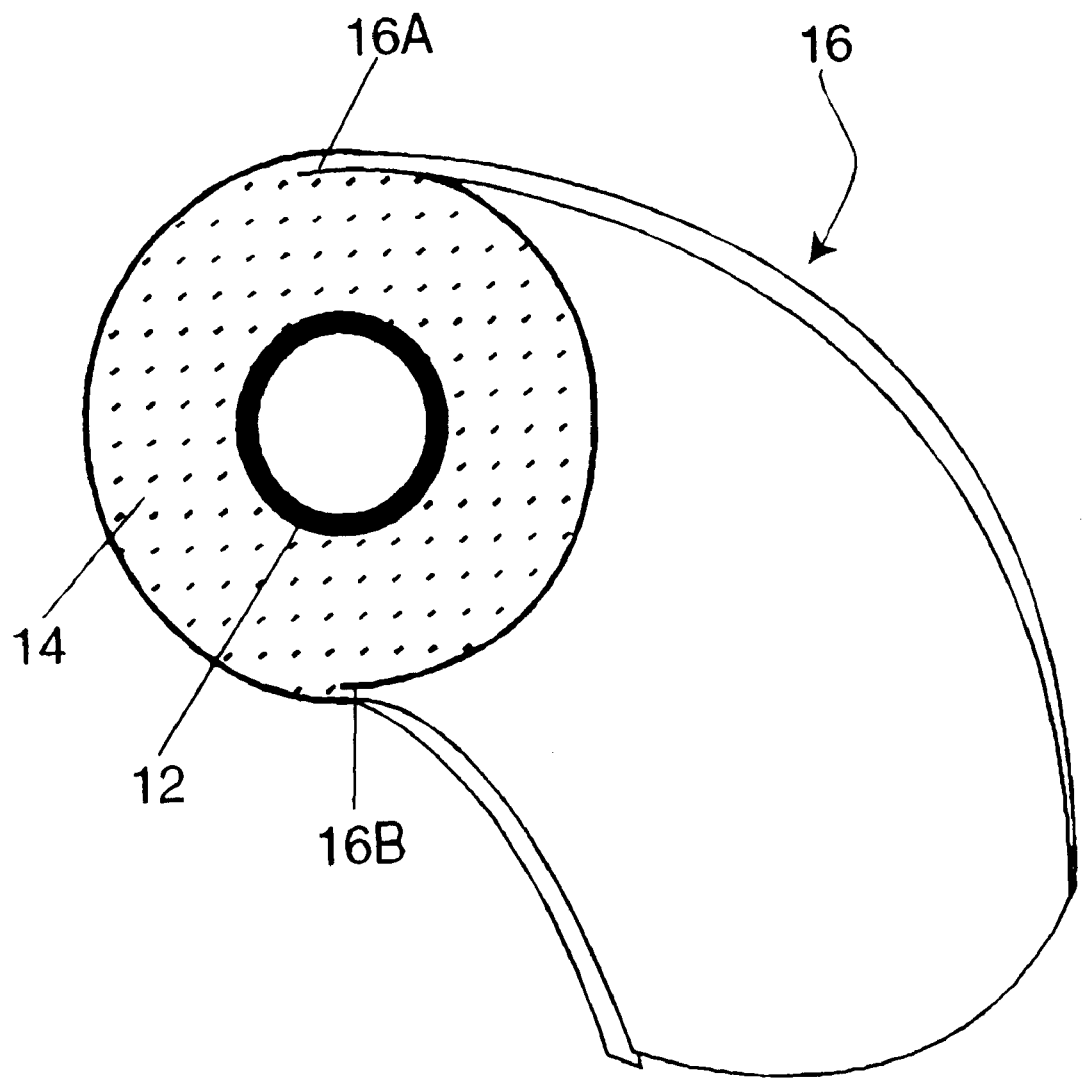
FIG. 3 is a side-elevational view of a conduit covered by insulation and a jacket wherein the conduit, the insulation and the metal jacket form a fitting of less than a straight angle, such as an angle of 45°.

Installing metal jackets on fittings having less than straight angles, such at 45°, 90° and Tees is rather difficult. In order to provide conformity between the insulation 14 and metal jacket 16 in a conduit having a fitting of less than a straight angle, such as shown in FIG. 3, the lower half 16B of metal jacket 16, which is the inside radius of the metal jacket, is kept straight, while the upper half 16A of metal jacket 16, which is the outside radius of the metal jacket, is slightly bent inward. This inward bend is designed to help the metal "lay down", giving the appearance of a tight seal. This seam, however, was observed to be penetrated by water from storms and moisture from wet atmospheric conditions; water moves under the overlap and into the insulation on both the inside and outside radius of the overlaps.

Figure 4:
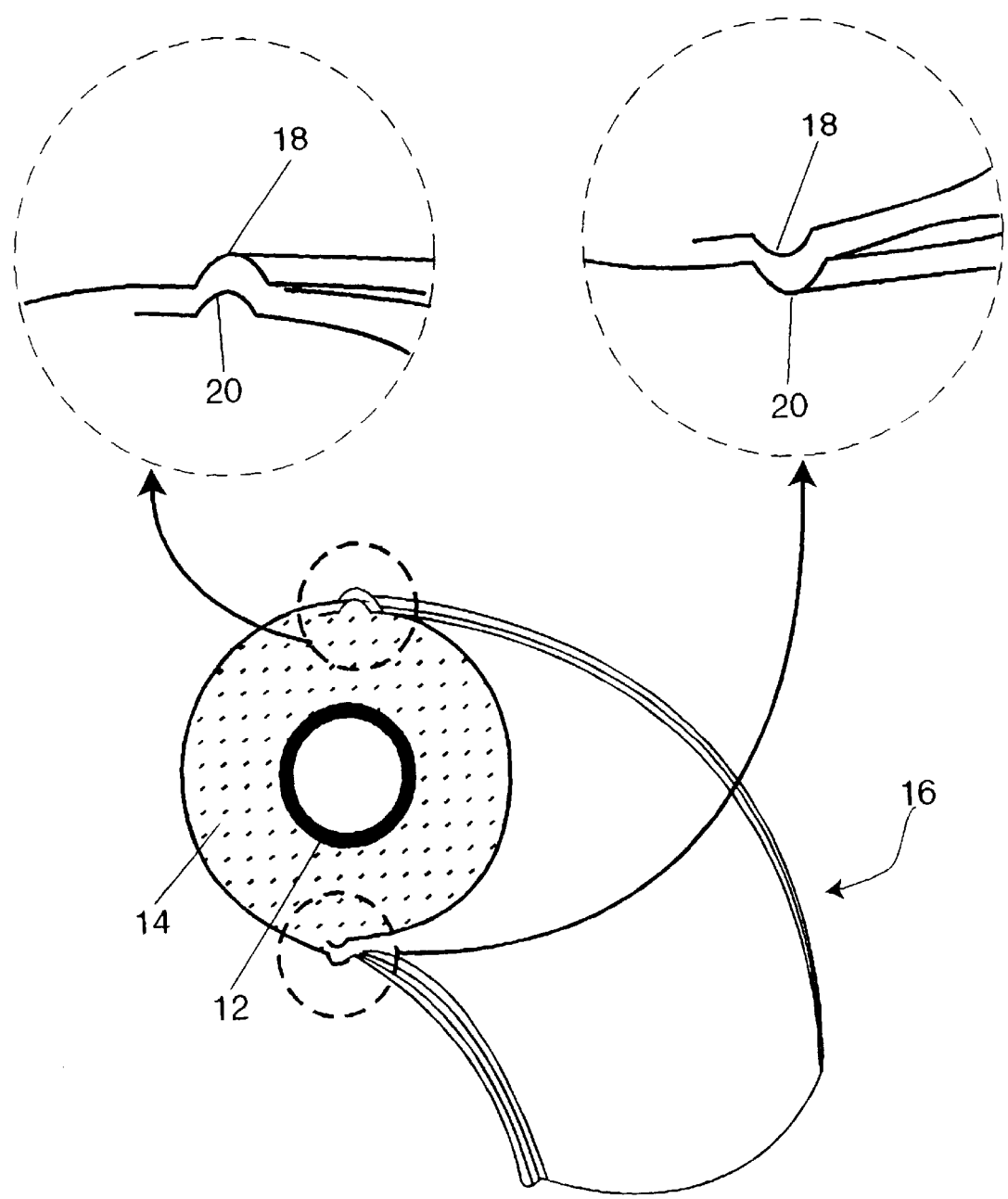
FIG. 4 is a side-elevational view of a conduit covered by insulation and a jacket wherein the conduit, the insulation and the metal jacket form a fitting of less than a straight angle, such as an angle of 45°, and the jacket is provided with grooves and ribs to guide water away from the overlaps of the jacket.

The prior art has proposed a simple but effective solution for the problem of water penetration into the jacket covering the insulation. For example, U.S. Pat. No. 3,153,546 discloses a jacket whose sections have overlapping connecting flanges formed with inter-engageable ribs and grooves, which direct water away from the insulation. This approach to solving the water penetration problem into the insulation is illustrated in FIG. 4.

Grooves and ribs 18 and 20 conform to each other. When water gets under the overlaps, it runs into the ridge formed by the grooves and ribs and is guided down and out of the jacketing at the bottom.

In installing a jacket over an insulated conduit, it is important that the jacket tightly conform to the insulation. Whether the insulation is soft, semi-rigid or rigid, it has a large tolerance in its diameter. In order to tightly adjust the jacket over the insulation, the jacket also must have a large tolerance. A simple ridge system, such as illustrated in FIG. 4, does not allow for any adjustment of the jacket circumference and, therefore, cannot be used on rigid insulation. Even on soft fibrous insulation which can be somewhat compressed, the circumferential dimension of the jacket must be about the same as the circumferential dimension of the underlying insulation.

It has now discovered that adjustability can be built into jackets whereby the jackets can be tightly conformed to the underlying insulation.

FIGS. 5A–5D schematically show overlaps of jacket fittings having built-in ridges and matching grooves therein. The ridges and grooves allow incremental adjustments of the jackets.

Figure 5A:
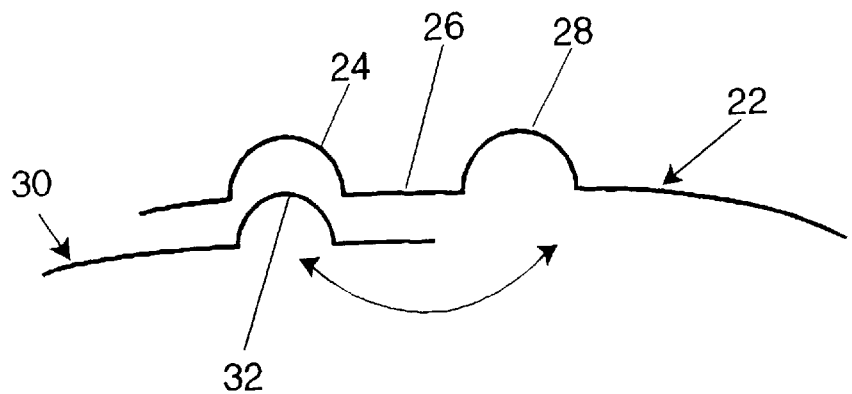
FIG. 5A is a schematic representation of a jacket fitting having an overlap, wherein the overlap comprises two rounded grooves in the top layer of the overlap and two rounded ridge in the bottom layer of the overlap.

FIG. 5A is a schematic representation of a jacket fitting having an overlap, wherein the overlap comprises two rounded grooves 24 and 28 in the top layer 22 of the overlap and one rounded ridge 32 in the bottom layer 30 of the overlap. Incremental tightening of the jacket is accomplished by sliding and moving either the top layer 22 or the bottom layer 30 so that ridge 32 is positioned into groove 28. The distance denoted by the numeral 26 between grooves 24 and groove 28 can be of from about 0.25 to about 1.0 inch or more depending on the quality of firmness and diameter of the underlying insulation. This embodiment allows for only one incremental adjustment of the overlapping jacket.

Figure 5B:
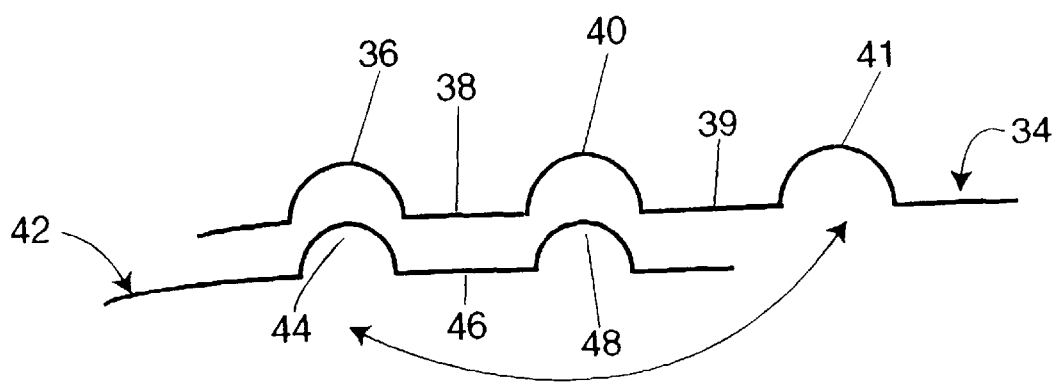
FIG. 5B is a schematic representation of a jacket fitting having an overlap, wherein the overlap comprises three rounded grooves in the top layer of the overlap and one rounded ridges in the bottom layer of the overlap.

FIG. 5B is a schematic representation of a jacket fitting having an overlap, wherein the overlap comprises three rounded grooves 36, 40 and 41 in the top layer 34 of the overlap and two rounded ridges 44 and 48 in the bottom layer 42 of the overlap. Incremental tightening of the jacket is accomplished by sliding and moving either the top layer 34 or the bottom layer 42 so that ridge 44 is positioned into groove 41. It is to be noted that this embodiment of the invention includes, in addition to what is shown in FIG. 5A, a plurality of grooves and matching ridges so that the incremental adjustment of the overlap can be repeated several times as desired.

Similarly to that described in FIG. 5A, the distance between grooves, denoted by the numerals 38 and 39, can be of from about 0.25 to about 1.0 inch or more depending on the quality of firmness and the diameter of the underlying insulation. The distance 46 between ridges 44 and 48 is approximately the same or slightly less than the distance between the grooves. Also, as will be appreciated by those skilled in the art, it will be recognized that the ridges matching the corresponding grooves are just slightly less in size than the grooves so that the matching of the grooves and corresponding ridges will be easy. The height of the grooves and ridges are typically in the range of from about 0.25 to about 1.5 inches or larger, which is mostly dependent on the environment in which the jacket is used: in an environment where heavy rain is prevalent, the grooves and ridges should be larger in size in order to direct large amounts of water away from the fitting.

Figure 5C:
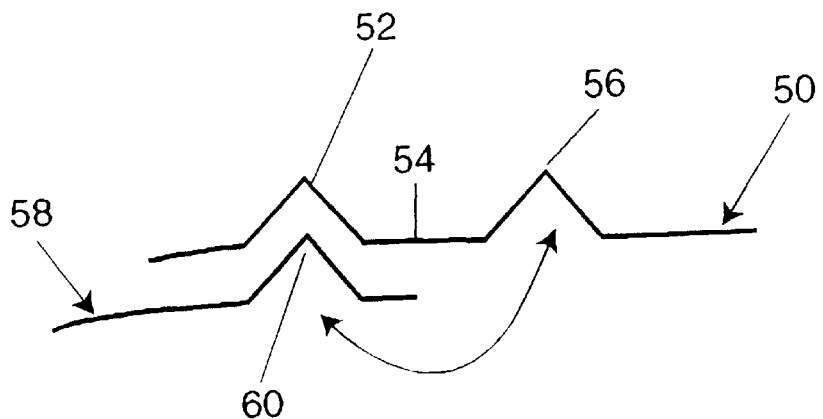
FIG. 5C is a schematic representation of a jacket fitting having an overlap, wherein the overlap comprises two inverted V-shaped grooves in the top layer of the overlap and one inverted V-shaped ridge in the bottom layer of the overlap.

FIG. 5C is a schematic representation of a jacket fitting having an overlap, wherein the overlap comprises two inverted V-shape grooves 52 and 56 in the top layer 50 of the overlap and one inverted V-shape ridge 60 in the bottom layer 58 of the overlap. Incremental tightening of the jacket is accomplished by sliding and moving either the top layer 50 or the bottom layer 58 so that ridge 60 is positioned into groove 56. The distance denoted by the numeral 54 between grooves 52 and 56 can be of from about 0.25 to about 1.0 inch or more, depending on the quality of firmness and the diameter of the underlying insulation. This embodiment, similarly to the embodiment described with respect to FIG. 5A allows only for one incremental adjustment of the overlapping jacket.

Figure 5D:
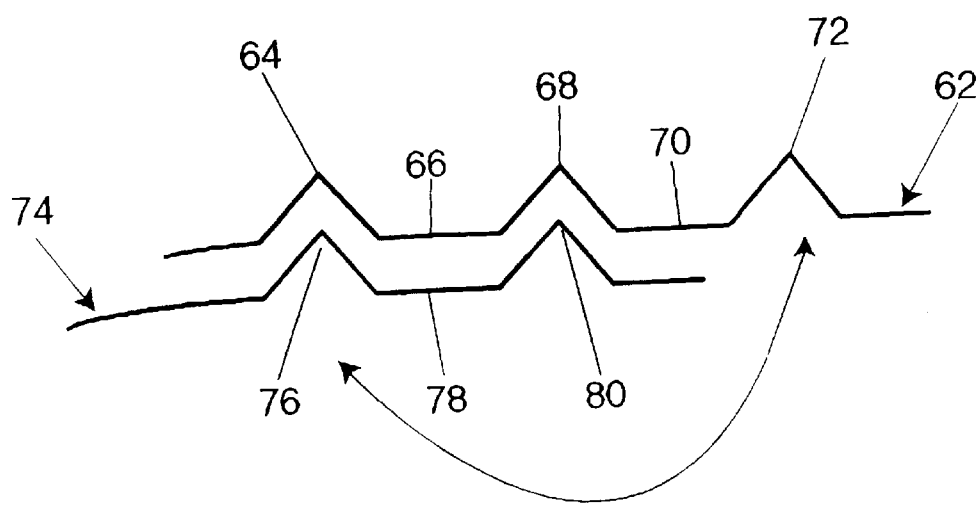
FIG. 5D is a schematic representation of a jacket fitting having an overlap, wherein the overlap comprises three inverted V-shaped grooves in the top layer of the overlap and two inverted V-shaped ridges in the bottom layer of the overlap.

FIG. 5D is a schematic representation of a jacket fitting having an overlap, wherein the overlap comprises three inverted V-shape grooves 64, 68 and 72 in the top layer 62 of the overlap and two inverted V-shape ridges 76 and 80 in the bottom layer 74 of the overlap. Incremental tightening of the jacket is accomplished by sliding and moving either the top layer 62 or the bottom layer 74 so that ridge 76 is positioned into groove 68. It is to be noted that this embodiment of the invention, similarly to that described in FIG. 5B, includes a plurality of grooves and matching ridges so that the incremental adjustment of the overlap can be repeated several times as desired.

Similarly to that described in FIGS. 5A–5C, the distance between grooves denoted by the numeral 66 between grooves 64 and 68, and the distance denoted by the numeral 70 between grooves 68 and 72 can be of from about 0.25 to about 1.0 inch or more, depending on the quality of firmness and the diameter of the underlying insulation. The distance denoted by the numeral 78 between ridges 76 and 80 is approximately the same or slightly less than the distance between the grooves.

Figure 6:
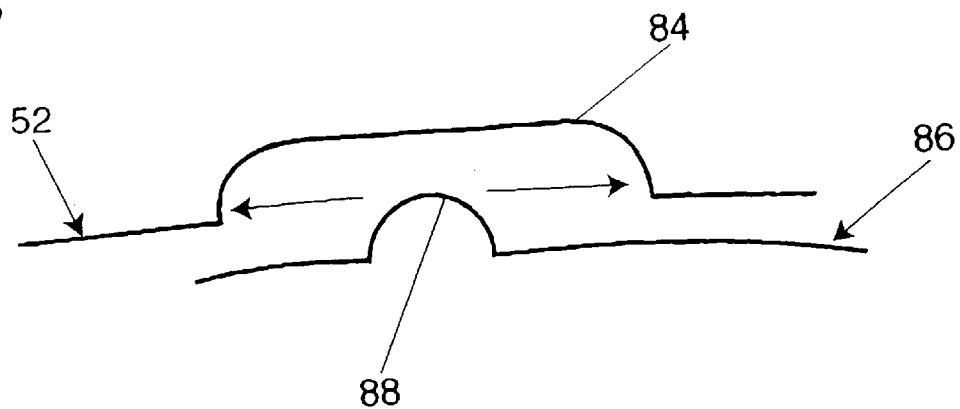
FIG. 6 is a schematic representation of a jacket fitting having an overlap, wherein the overlap comprises a generally flat, extended groove in the top layer of the overlap and a round ridge in the bottom layer of the overlap.

FIG. 6 is a schematic representation of another embodiment of the present invention of a jacket fitting having an overlap, wherein the overlap comprises a generally flat, extended groove 84 in the top layer 82 of the overlap and a generally rounded ridge 88 in the bottom layer 86 of the overlap. This overlap allows for exact tensioning of the overlap over the insulation. The exact tensioning is accomplished by sliding the top layer 82 or the bottom layer 86 of the overlap so that ridge 88 moves within groove 84. While this design allows for exact tensioning of the jacket, it does not provide for a wide range of tolerance. The range of tolerance of ridge 88 within groove 84 is typically of from about 1.5 to about 3.5 inches. This jacket design can, of course, be used on both sides, i.e., both halves of the jacket to allow double sliding movement of ridge 88 within groove 84.

It is, however, preferred to use a combination of jacket design described in FIGS. 5A–5D with the jacket design described in FIG. 6. The combination allows tightening of the jacket in large increments using the design of FIGS. 5A–5D, and then finally tensioning the jacket using the design described in FIG. 6. The design of FIGS. 5A–5D is positioned on one side of the jacket and the design of FIG. 6 is positioned on the other side of the jacket.

Figure 7:
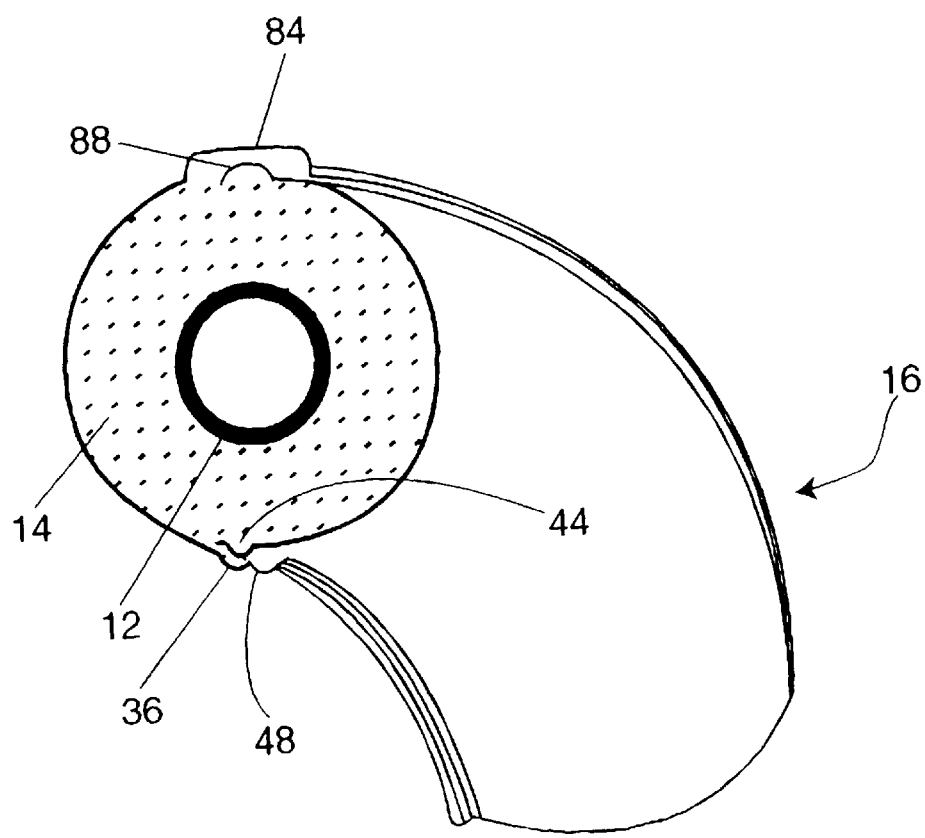
FIG. 7 shows in side-elevational view the combination of the jacket overlap design of FIG. 5A and FIG. 6.

The combination of the two types of design is shown in FIG. 7. Forming the overlap with the combination of the designs, the jacket provides both a superior weather barrier and allows the jacket to be tightened snugly over the insulation. The combination design can be used for all types of insulation, including rigid insulation which has no "give" and requires the jacket to accommodate both large and small circumferences. By having the jacket fit snugly over the insulation, the rigid insulation is contained and supported by the jacket and better survives foot traffic without bending or denting the jacket. For maintenance purposes of industrial conduit, when walking on the insulated and jacketed conduit, the jacket should be of metal, such as stainless steel or aluminum.

Figure 8:
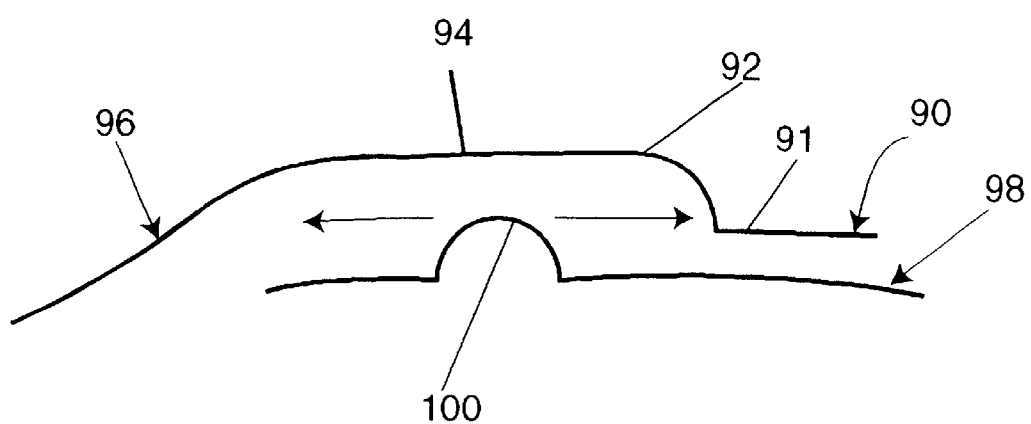
FIG. 8 is a schematic representation of a jacket fitting having an overlap, wherein the overlap comprises a top layer and a bottom layer wherein said top layer comprises a first flat portion at one end thereof, and a rounded elevational portion extending above said first flat portion, and extended flat middle portion running form said rounded elevational portion towards the other end of said top layer, and a second slightly declining portion extending from said flat middle portion constituting the other end of said top layer; and said bottom layer comprises a semi-circular ridge extending towards the middle portion in the top layer.

FIG. 8 is a schematic representation of another embodiment of the present invention of a jacket fitting having an overlap on the opposite sides of the jacket. Each overlap comprises a top layer 90 and a bottom layer 98. The top layer comprises: a first flat potion 91 at one end of the layer; a rounded elevational portion 92 extending above the first flat portion; an extended flat middle portion 94 running from the rounded elevational portion towards the other end of the layer and being parallel to the first flat portion 91; and a second slightly declining portion 96 extending from the flat middle portion 94 constituting the other end of said top layer. The bottom layer 98 comprises a semi-circular ridge 100 rising towards the middle portion 94 of the top layer 90. As shown by the arrows in FIG. 8, tensioning of the jacket fitting is accomplished by moving either the top or bottom layers with respect to each other so that semi-circular ridge 100 approaches or moves away from rounded elevational portion 92. Moving the semi-circular ridge 100 towards rounded elevational portion 92 results in a limited tensioning when semi-circular ridge 100 reaches rounded elevational portion 92. However, when semi-circular ridge moves towards the slightly declining portion 96 further tensioning is not limited, i.e. the respective movement of the layers is unlimited. This type of jacket fitting is preferred for use when the exact circumferential measurement of the insulation is not provided to the installer or the insulation is semi-rigid or soft so that conformity between the jacket fitting and the underlying insulation can be achieved. Slightly declining portion 96 is easily bent towards bottom layer 98 and can be tightly secured thereto by the use of metal screws, metal bends or straps.

FIG. 8A shows in a side-elevation view the jacket overlap design generally designated at 102 wherein two half jacket fittings shown in FIG. 8 are joined together over an insulated pipe joint in which: the numerals 108 and 110 represent the inner half and outer half respectively; the numeral 104 represents the pipe; the numeral 106 represents the pipe insulation; the numeral 128 represents metal screws; and the jacket overlaps on opposite sides to each other on the insulated pipe are shown in ghost, wherein the numerals denoting the various parts are the same as in FIG. 8. It is to be noted that ridge 100 deforms the middle portion 94 in top layer 90 to form its own groove when the jacket is tightened over the insulated pipe. The groove so formed fits the ridge more precisely than if middle portion 94 had been manufactured with a preformed groove. The joint is therefore more water-tight and continuously adjustable rather than incrementally adjustable as would be the case with preformed grooves.

Figure 8B:
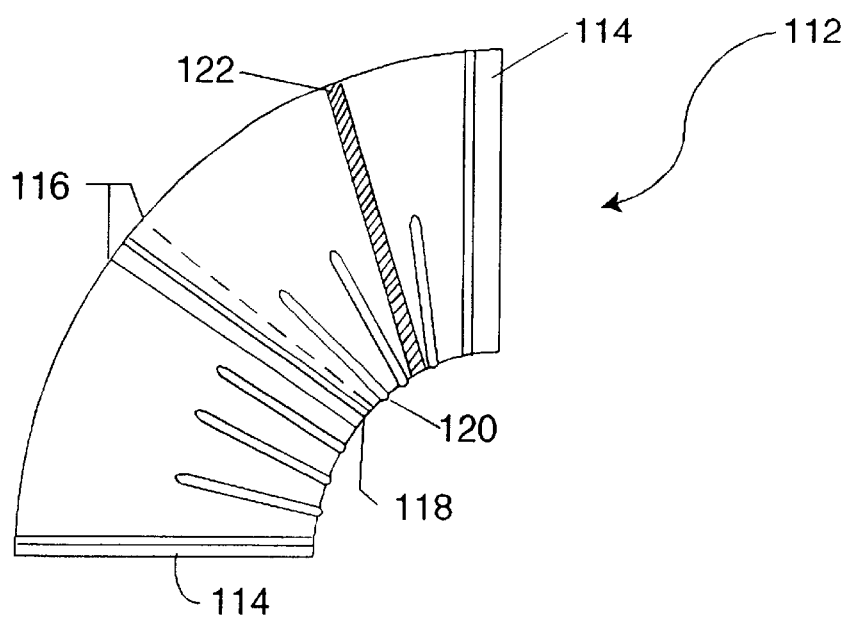
FIG. 8B shows in another side-elevation view the jacket fitting over the insulated pipe joint rotated 90° to that shown in FIG. 8A.

FIG. 8B shows in another side elevational view the jacket fitting over the insulated pipe joint rotated 90° to that shown in FIG. 8A, wherein: the numeral 112 generally designates the jacket fitting; the numeral 114 designates the overlap to straight jacketing; the numeral 116 represents the overlap of two 45° segments applied in watershed manner; the numeral 118 shows where aligning ribs sections snap together exactly to block water penetration; the numeral 120 represents reinforcing ribs; and the numeral 122 represents a band for tensioning and securing the jacket over the insulation.

Figure 8C:
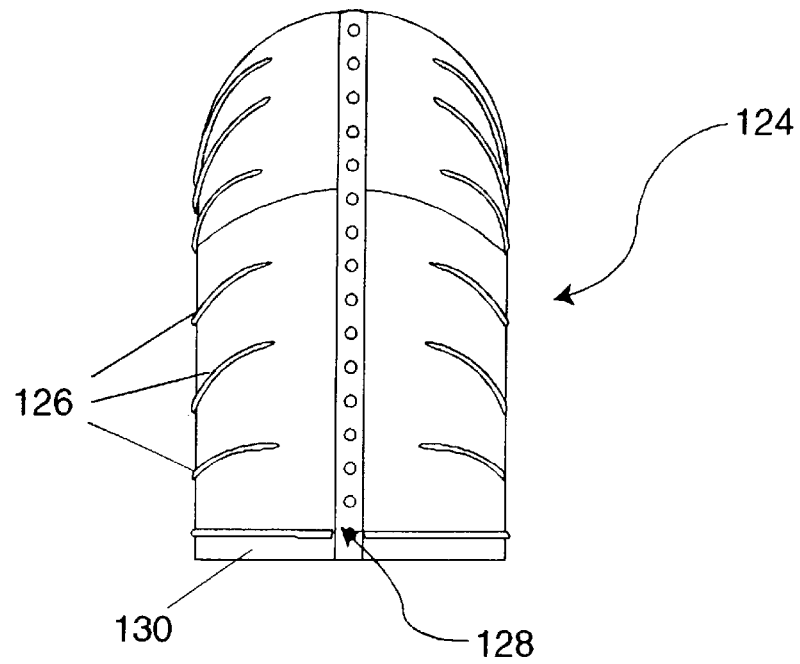
FIG. 8C shows in another side-elevational view the jacket fitting over the insulated pipe joint rotated 180° to that shown in FIG. 8A.

FIG. 8C shows in another side-elevational view the jacket fitting over the insulated pipe joint rotated 180° to that shown in FIG. 8A, wherein: the numeral 124 generally designates the jacket fitting; the numeral 126 represents reinforcing ribs; the numeral 128 designates metal screws; and the numeral 130 represents the overlap to straight jacketing. It is to be noted in connection with FIGS. 8B and 8C that reinforcing ribs 120 and 126 not only afford greater strength and rigidity to the jacket, but they also permit the rapid assembly of precision bends and T-joints from modular pieces. The side elevational views of the jacket shown in FIGS. 8A and 8B illustrate that to obtain a 45° bend, four pieces are required: 2 inner halves and 2 outer halves, each being precisely 22.5°. By interlocking the reinforcing ribs, the installer can rapidly and precisely assemble a 45° bend without having to estimate the right overlap for each piece.

The jacket fitting shown in FIGS. 8–8C is preferably made using 0.024 type 1100 aluminum alloy and made with both inner and outer halves. Each half segment is labeled "inner" and "outer" half with applicable sizes. Other materials, such as steel and plastics may also be used in the manufacture of the jacket fitting influenced by atmospheric and process conditions where the jacket fittings are used. The jacket fittings are made to particular angle requirements including radiuses of 45° or less, 90° or more and T-configurations. Thickness of the material from which the jacket fittings are made depends on the materials used and the process or environmental conditions under which the jacket fittings are used. The overlap of the layers may be of form about 0.5 to about 3" or more depending on environmental conditions and on the underlying insulation being rigid, semi-rigid or soft.

Thickness of the jacket fitting made of aluminum alloy and steel is about 0.024" or more, and for a jacket fitting made of plastic is at least about 0.024" and preferably higher. Preferred plastic for use in jacket fittings are polyethylene and polypropylene.

Figure 9:
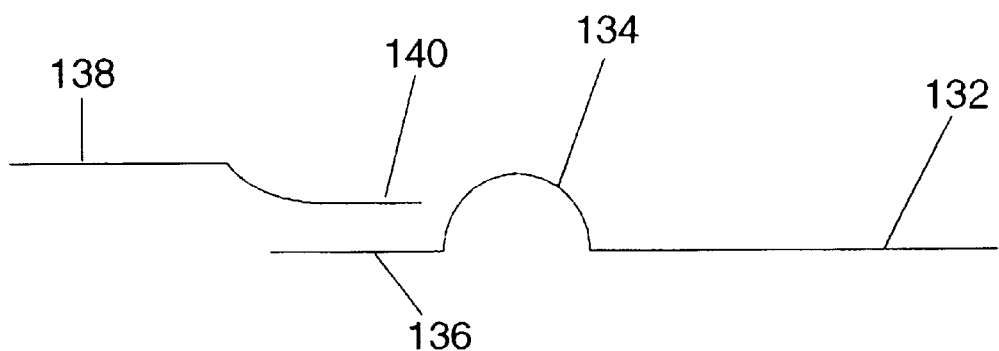
FIG. 9 is a schematic representation of a jacket fitting having an over lap, wherein the overlap comprises a top layer and a bottom layer wherein said top layer terminates at both ends thereof into a flat half-channel bending towards the bottom layer to parallely conform to said bottom layer; and said bottom layer comprises a flat portion at both ends thereof, and a semi-circular ridge adjacent to one of said flat end portions.
Figure 9A:
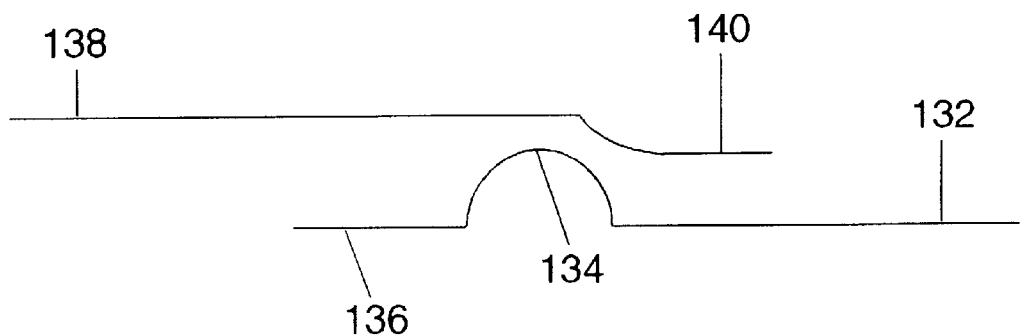
FIG. 9A is a schematic representation of the jacket fitting wherein the overlap between top and bottom layers is shown in a more tightened position as compared to the overlap of the layers shown in FIG. 9.
Figure 9B:
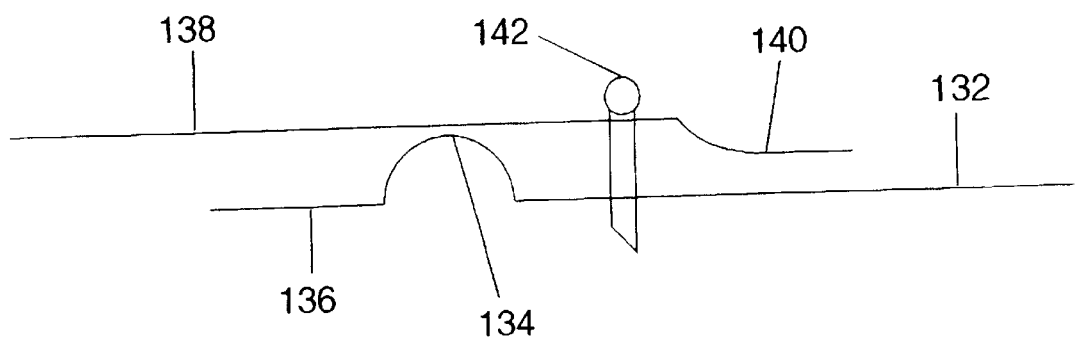
FIG. 9B is a schematic representation of the jacket fitting wherein the overlap between the top and bottom layers is shown in a more tightened position as compared to the overlap of the layers shown in FIG. 9A.
Figure 9C:
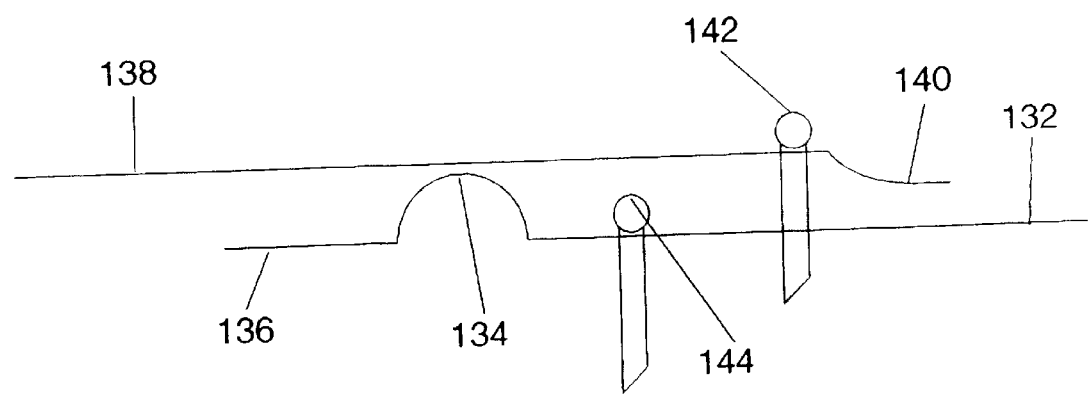
FIG. 9C is a schematic representation of the jacket fitting wherein the overlap between the top and bottom layers is further extended as compared to FIG. 9B.

FIGS. 9–9C are schematic representations of a jacket fitting having an overlap, wherein the overlap comprises a top layer 138 and a bottom layer 132. Said top layer terminates in a flat half-channel 140 bending towards and conforming to said bottom layer. Said bottom layer comprises: a small flat portion 136 at one end of the layer; a semi-circular ridge 134 adjacent to the small flat portion; and a large flat portion extending away from the semi-circular ridge towards the other end of the layer.

As shown in FIG. 9, the flat half-channel 140 in top layer is superimposed on the top of the small flat portion in bottom layer and prevents moisture from entering under the jacket fitting when the moisture runs down by gravity from semi-circular ridge 134. In this configuration the inner and outer layers of the jacket fitting is preferably secured and held together by straps or cords without the use of metal screws. Further, this configuration is used when the circumferential dimensions of the underlying insulation is known precisely so that the flat half-channel 140 precisely overlaps with and conforms to the small flat portion 136. This jacket fitting is used over rigid or at least semi-rigid insulation so that upon installment and tightening of the jacket fitting requires very little movement of the layers to achieve the waterproof overlap.

As illustrated in FIG. 9A, when the tolerances in the circumferential dimensions of the underlying insulation is not precisely known, the layers may be moved with respect to each other so that the flat half-channel 140 is on the other side of the semi-circular ridge 134 and conforms right adjacent to semi-circular ridge 134 in second layer 132. This adjustment/tightening of the layers allows 1 to 3 inches of movement of the respective layers. In this configuration it is preferred to use bands and straps to hold the jacket fitting over the insulation. As will be recognized by those skilled in the art, moisture/precipitation are prevented from entering into the underlying insulation since the flat half-channel 140 tightly conforms to the flat second layer 132. This configuration of the jacket fitting is preferably used over rigid or semi-rigid insulation.

In FIG. 9B flat half-channel 140 is further moved away from the semi-circular ridge 134 necessitated by either imprecise data on the circumferential dimensions of the underlying insulation or the nature of the insulation with regard to its rigidity/softness.

In this configuration it is preferred to use a metal screw 142 through both layers but adjacent to the flat half-channel 140 to secure the jacket fitting to the underlying insulation in order to tightly conform flat half-channel 140 to second layer 132 thereby preventing water penetration into the insulation.

FIG. 9C illustrates the occasion when the circumferential dimensions of the underlying insulation is not known requiring extensive shifting of the top and bottom layers of the jacket fitting. In this configuration it is preferred to use two metal screws, one screw 144 is inserted through the bottom layer 132 into the underlying insulation, and the other metal screw 142 is inserted through both layers into the underlying insulation.

Figure 9D:
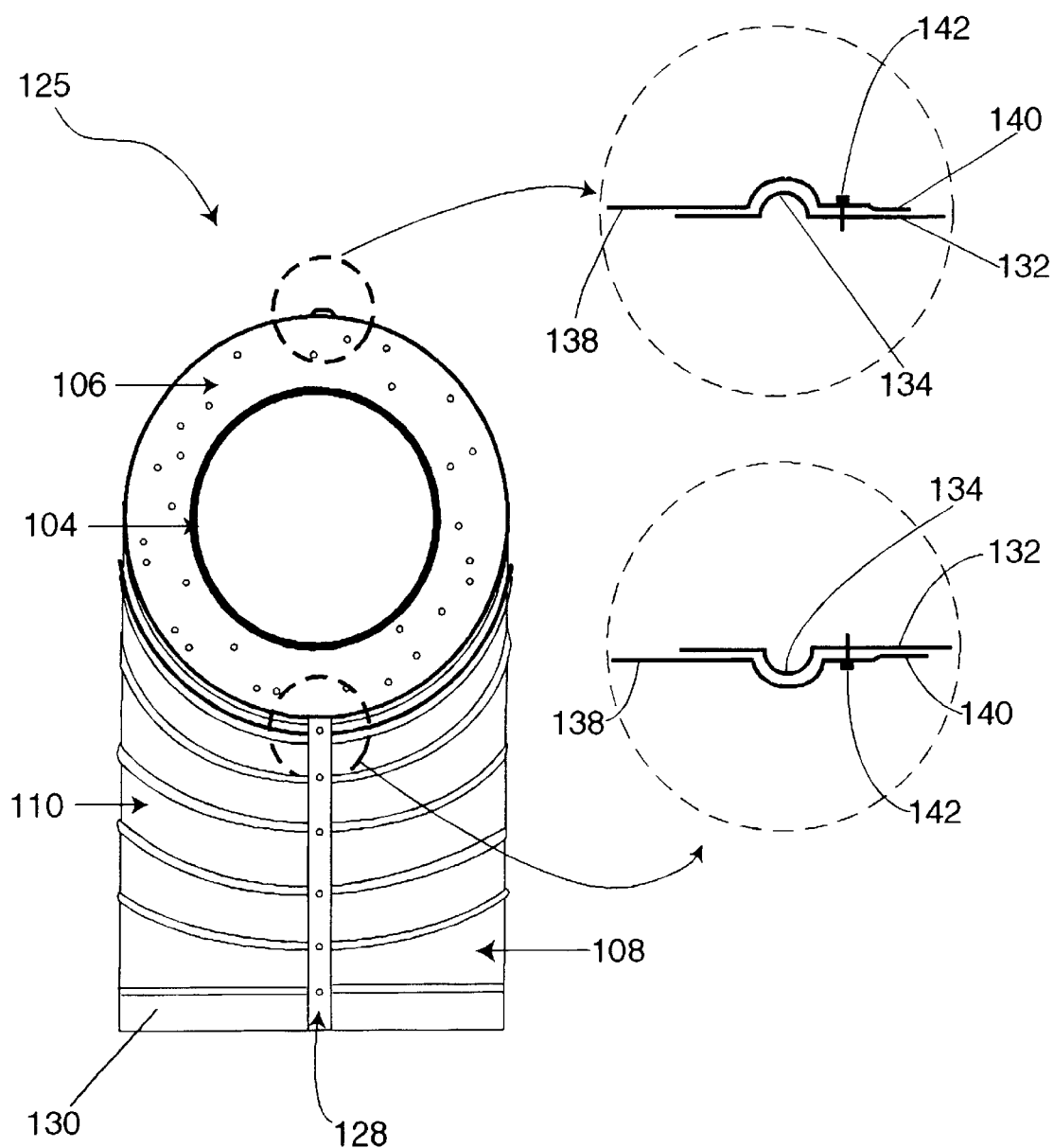
FIG. 9D shows in a side-elevational view the jacket overlap design wherein the two half jackets shown in FIGS. 9–9C are joined together over an insulated pipe joint.

FIG. 9D shows in a side-elevational view the jacket overlap design generally designated at 125 wherein two half jacket fittings shown in FIG. 9B are joined together over an insulated pipe joint in which: the numerals 108 and 110 represent the inner half and outer half respectively; the numeral 104 represents the pipe; the numeral 106 represents the pipe insulation; the numeral 128 represents metal screws; and the jacket overlaps on opposite sides to each other on the insulated pipe are shown in ghost, wherein the numerals denoting the various parts are the same as in FIG. 9.

The jacket fitting designs shown in FIGS. 9A–9C are similarly applied to half-jackets described and shown in FIG. 9D.

The method of installing jackets, metal or plastic, over insulations includes the step of: securing the jacket with sheet metal screws, evenly spaced in the overlaps, while the jacket is tightly held in place with "bungee type cords" or other devices that will tightly adjust the flaps of the jacket.

The jacket can also be held in place with metal bands or straps which are properly tensioned to tighten the jacket around the insulation. Both methods can be used singly or in combination.

While the designs of jacket fitting illustrated in the drawings show fitting having approximately 45° angles, the designs include jacket fitting of 90°, Tees and vertical and horizontal straight run jacketings.

Having described the invention, it will be obvious to those skilled in the art that various modifications of the invention can be made without departing from the spirit and scope of the invention.

PARTS LIST

Prior Art (FIGS. 1–4)

| | |
|---|---|
| Assembly of metal pipe, insulation and metal jacket (generally designated) | 10 |
| Metal pipe | 12 |
| Insulation | 14 |
| Metal jacket | 16 |
| Metal jackets comprising two halves | 16A & 16B |
| Point of overlap between two halves | P |
| Grooves and ribs in jacket | 18 & 20 |

First Embodiment (FIG. 5A)

| | |
|---|---|
| Top layer of jacket fitting | 22 |
| Rounded grooves in top layer | 24, 28 |
| Distance between rounded grooves | 26 |
| Bottom layer of jacket fitting | 30 |
| Ridge in bottom layer | 32 |

Second Embodiment (FIG. 5B)

| | |
|---|---|
| Top layer of jacket fitting | 34 |
| Rounded grooves in top layer | 36, 40, 41 |
| Bottom layer of jacket fitting | 42 |
| Rounded ridge in bottom layer | 44, 48 |
| Distance between rounded grooves | 38, 39 |
| Distance between rounded ridges | 46 |

Third Embodiment (FIG. 5C)

| | |
|---|---|
| Top layer of jacket fitting | 50 |
| Inverted V-shaped grooves in top layer | 52, 56 |
| Bottom layer of jacket fitting | 58 |
| V-shaped ridge in bottom layer | 60 |
| Distance between V-shaped grooves in top layer | 54 |

Fourth Embodiment (FIG. 5D)

| | |
|---|---|
| Top layer of jacket fitting | 62 |
| Inverted V-shaped grooves in top layer | 64, 68, 72 |
| Bottom layer of jacket fitting | 74 |
| Inverted V-shaped ridge in bottom layer | 76, 80 |
| Distance between inverted V-shaped grooves in top layer | 66, 70 |
| Distance between V-shaped ridges in bottom layer | 78 |

-continued

PARTS LIST

Fifth Embodiment (FIG. 6)

| | |
|---|---|
| Top layer of jacket fitting | 82 |
| Extended groove in top layer | 84 |
| Bottom layer of jacket fitting | 86 |
| Rounded ridge in bottom layer | 88 |

Sixth Embodiment (FIG. 7)

The numerals defined in FIGS. 5A–5D and FIG. 6 apply in this embodiment.

Seventh Embodiment (FIGS. 8–8C)

| | |
|---|---|
| Top layer of jacket fitting | 90 |
| First flat portion in top layer | 91 |
| Rounded elevational portion in top layer | 92 |
| Extended flat middle portion in top layer | 94 |
| Second, slightly declining portion in top layer | 96 |
| Bottom layer of jacket fitting | 98 |
| Semi-circular ridge in bottom layer | 100 |
| Jacket overlap design, generally designated | 102, 112, 124, 125 |
| Pipe | 104 |
| Pipe insulation | 106 |
| Inner half of jacket fitting | 108 |
| Outer half of jacket fitting | 110 |
| Metal screws in jacket fitting | 128 |
| Overlap to straight jacketing | 114, 130 |
| Overlap of two 45° segments | 116 |
| Alignment of rib sections | 118 |
| Reinforcing ribs | 120, 126 |
| Band for tensioning and securing | 122 |

Eighth Embodiment (FIGS. 9–9D)

| | |
|---|---|
| Top layer of jacket fitting | 138 |
| Bottom layer of jacket fitting | 132 |
| Half channel in top layer | 140 |
| Small flat portion in bottom layer | 136 |
| Semi-circular ridge in bottom layer | 134 |
| Jacket overlap design, generally designated | 125 |
| Inner half of jacket fitting | 108 |
| Outer half of jacket fitting | 110 |
| Pipe | 104 |
| Pipe insulation | 106 |
| Metal screws in jacket fitting, generally designated | 128 |
| Metal screw | 142, 144 |

What is claimed is:

1. A jacket adjustable on two sides thereof for an insulated conduit carrying a fluid therein, the jacket comprising:
   a longitudinal first section having end portions and side portions and being of a generally semi-circular cross-sectional configuration;
   a longitudinal second section having end portions and side portions and being of a generally semi-circular cross-sectional configuration,
      wherein said longitudinal first section and said longitudinal second section form a generally cylindrical configuration over an insulated conduit;
   a longitudinal flange projecting from each of said side portions of said first section;
   a longitudinal flange projecting from each of said side portions of said second section;
   each of said longitudinal flanges having a top layer and a bottom layer, said top layer of said longitudinal flanges projecting from each of said side portions of said first section and said second section comprises a groove having an open side and a closed side defined by:
      a first flat portion;
      a rounded elevational portion constituting one side of said groove extending above the first flat portion and being contiguous therewith;

an extended flat middle portion constituting a top of said groove running form said rounded elevational portion and being parallel to said first flat portion; and a slightly declining second flat portion extending from said middle portion and constituting the open side of said groove;

said bottom layer of said longitudinal flanges projecting from each of said side portions of said first section and said second section comprises a longitudinal ridge extending towards said flat middle portion of said groove in the top layer for slideable engagement therewith whereby said first section and said second section of the jacket allows tightening of the jacket over an insulated conduit.

2. The jacket of claim 1 wherein said longitudinal ridge in said bottom layer is of semi-circular configuration.

3. The jacket of claim 1 made of stainless steel, aluminum or thermoplastic materials.

4. The jacket of claim 1 wherein said insulation is rigid.

5. The jacket of claim 4 wherein said insulation is selected from the group consisting of calcium silicate, perlite silicate, cellular glass, styrofoam and polyisocyanourate/urethane.

6. The jacket of claim 1 wherein said insulation is semi-rigid.

7. The jacket of claim 6 wherein said insulation is high density mineral wool.

8. The jacket of claim 1 wherein said insulation is soft insulation.

9. The jacket of claim 8 wherein said insulation is selected from the group consisting of soft fiberglass, soft elastomers and soft elastomeric foams.

10. The jacket of claim 1 wherein said insulated conduit is of a configuration selected from the group consisting of straight, 45° angle, 90° angle and T angle.

11. A method of applying an adjustable jacket around insulated straight or bend conduits comprising the steps of:

1) providing an adjustable jacket comprising:

a longitudinal first section having end portions and side portions and being of a generally semi-circular cross-sectional configuration;

a longitudinal second section having end portions and side portions and being of a generally semi-circular cross-sectional configuration, wherein said longitudinal first section and said longitudinal second section form a generally cylindrical configuration over an insulated conduit;

a longitudinal flange projecting from each of said side portions of said first section;

a longitudinal flange projecting from each of said side portions of said second section;

each of said longitudinal flanges having a top layer and a bottom layer, said top layer of said longitudinal flanges projecting from each of said side portions of said first section and said second section comprises a groove having an open side and a closed side defined by:

a first flat portion;

a rounded elevational portion constituting one side of said groove extending above the first flat portion and being contiguous therewith;

an extended flat middle portion constituting a top of said groove running form said rounded elevational portion and being parallel to said first flat portion; and a slightly declining second flat portion extending from said middle portion and constituting the open side of said groove;

said bottom layer of said longitudinal flanges projecting from each of said side portions of said first section and said second section comprises a longitudinal ridge extending towards said flat middle portion of said groove in the top layer for slideable engagement therewith whereby said first section and said second section of the jacket allows tightening of the jacket over an insulated conduit;

2) tightening said longitudinal flanges over the insulated conduit by sliding said bottom layer having said longitudinal ridge therein in said groove in the top layer for tight conformance of said adjustable jacket over said insulated conduit; and 3) securing the tightened jacket with metal bands, straps or sheet metal screws to the insulated conduit.

12. The method of claim 11 wherein said longitudinal ridge in said bottom layer is of semi-circular configuration.

13. The method of claim 11 wherein said jacket is made of stainless steel, aluminum or thermoplastic materials.

14. The method of claim 11 wherein said insulation is rigid.

15. The method of claim 14 wherein said insulation is selected from the group consisting of calcium silicate, perlite silicate, cellular glass, styrofoam and polyisocyanourate/urethane.

16. The method of claim 11 wherein said insulation is semi-rigid.

17. The method of claim 11 wherein said insulation is high density mineral wool.

18. The method of claim 11 wherein said insulation is soft insulation.

19. The method of claim 18 wherein said insulation is selected from the group consisting of soft fiberglass, soft elastomers, and soft elastomeric foams.

20. A jacket adjustable on two sides thereof for an insulated conduit carrying a fluid therein, the jacket comprising:

a longitudinal first section having end portions and side portions and being of a generally semi-circular cross-sectional configuration;

a longitudinal second section having end portions and side portions and being of a generally semi-circular cross-sectional configuration, wherein said longitudinal first section and said longitudinal second section form a generally cylindrical configuration over an insulated conduit;

a longitudinal flange projecting from each of said side portions of said first section;

a longitudinal flange projecting from each of said side portions of said second section;

each of said longitudinal flanges having a top layer and a bottom layer, said top layer of said longitudinal flanges projecting from each of said side portions of said first section and said second section comprises a half channel bending towards and conforming to said bottom layer;

said bottom layer of said longitudinal flanges projecting form each of said side portions of said first section and said second section comprises:

a small flat portion at one end of the layer;

a semi-circular ridge adjacent to the small flat portion; and a large flat portion extending away from the semi-circular ridge; wherein said top layer and said bottom layer form a slideable engagement with each other thereby allowing tightening of the jacket over an insulated conduit.

21. The jacket of claim 20 wherein said half channel in the top layer conforms to said small flat portion at one end of said bottom layer.

22. The jacket of claim 20 wherein said half channel in the top layer conforms to said large flat portion adjacent to said semi-circular ridge.

23. The jacket of claim 20 wherein said jacket is made of stainless steel, aluminum or thermoplastic materials.

24. The jacket of claim 20 wherein said insulation is rigid.

25. The jacket of claim 24 wherein said insulation is selected from the group consisting of calcium silicate, perlite silicate, cellular glass, styrofoam and polyisocyanourate/urethane.

26. The jacket of claim 20 wherein said insulation is semi-rigid.

27. The jacket of claim 26 wherein said insulation is high density mineral wool.

28. The jacket of claim 20 wherein said insulation is soft insulation.

29. The jacket of claim 28 wherein said insulation is selected from the group consisting of soft fiberglass, soft elastomers, and soft elastomeric foams.

30. A method of applying an adjustable jacket around insulated straight or bend conduits comprising the steps of:
   1) providing an adjustable jacket comprising:
      a longitudinal first section having end portions and side portions and being of a generally semi-circular cross-sectional configuration;
      a longitudinal second section having end portions and side portions and being of a generally semi-circular cross-sectional configuration,
      wherein said longitudinal first section and said longitudinal second section form a generally cylindrical configuration over an insulated conduit;
      a longitudinal flange projecting from each of said side portions of said first section;
      a longitudinal flange projecting from each of said side portions of said second section;
      each of said longitudinal flanges having a top layer and a bottom layer,
      said top layer of said longitudinal flanges projecting from each of said side portions of said first section and said second section comprises a half channel bending towards and conforming to said bottom layer;
      said bottom layer of said longitudinal flanges projecting form each of said side portions of said first section and said second section comprises:
      a small flat portion at one end of the layer;
      a semi-circular ridge adjacent to the small flat portion; and
      a large flat portion extending away from the semi-circular ridge;
   wherein
      said top layer and said bottom layer form a slideable engagement with each other thereby allowing tightening of the jacket over an insulated conduit;
   2) tightening said longitudinal flanges over the insulated conduit by sliding said top layer having said half channel therein over said bottom layer having said semi-circular ridge therein for tight conformance of said adjustable jacket over said insulated conduit; and
   3) securing the tightened jacket with metal bands, straps or sheet metal screws to the insulated conduit.

31. The method of claim 30 wherein said sheet metal screws are applied to the bottom layer of said adjustable jacket.

32. The method of claim 30 wherein said sheet metal screws are applied to the top and bottom layers of said adjustable jacket.

33. The method of claim 30 wherein said jacket is made of stainless steel, aluminum or thermoplastic materials.

34. The method of claim 30 wherein said insulation is rigid.

35. The method of claim 30 wherein said insulation is selected from the group consisting of calcium silicate, perlite silicate, cellular glass, styrofoam and polyisocyanourate/urethane.

36. The method of claim 30 wherein said insulation is semi-rigid.

37. The method of claim 36 wherein said insulation is high density mineral wool.

38. The method of claim 30 wherein said insulation is soft insulation.

39. The method of claim 38 wherein said insulation is selected from the group consisting of soft fiberglass, soft elastomers and soft elastomeric foams.

* * * * *